(12) United States Patent
Bankoski et al.

(10) Patent No.: US 9,154,799 B2
(45) Date of Patent: Oct. 6, 2015

(54) ENCODING AND DECODING MOTION VIA IMAGE SEGMENTATION

(75) Inventors: James Bankoski, Wynantskill, NY (US); Paul Wilkins, Cambridge (GB); Yaowu Xu, San Diego, CA (US)

(73) Assignee: GOOGLE INC., Mountain View, CA (US)

( * ) Notice: Subject to any disclaimer, the term of this patent is extended or adjusted under 35 U.S.C. 154(b) by 262 days.

(21) Appl. No.: 13/081,662

(22) Filed: Apr. 7, 2011

(65) Prior Publication Data

US 2012/0257677 A1    Oct. 11, 2012

(51) Int. Cl.
| | |
|---|---|
| *H04N 7/12* | (2006.01) |
| *H04N 19/17* | (2014.01) |
| *H04N 19/105* | (2014.01) |
| *H04N 19/46* | (2014.01) |
| *H04N 19/51* | (2014.01) |
| *H04N 19/137* | (2014.01) |
| *H04N 19/186* | (2014.01) |

(52) U.S. Cl.
CPC ............. *H04N 19/17* (2014.11); *H04N 19/105* (2014.11); *H04N 19/137* (2014.11); *H04N 19/186* (2014.11); *H04N 19/46* (2014.11); *H04N 19/51* (2014.11)

(58) Field of Classification Search
CPC ... H04N 19/105; H04N 19/137; H04N 19/17; H04N 19/186
See application file for complete search history.

(56) References Cited

U.S. PATENT DOCUMENTS

| | | | |
|---|---|---|---|
| 3,825,832 A | 7/1974 | Frei et al. | |
| 4,710,810 A | 12/1987 | Koga | |
| 4,719,642 A | 1/1988 | Lucas | |
| 4,729,127 A | 3/1988 | Chan et al. | |
| 4,736,446 A | 4/1988 | Reynolds et al. | |
| 4,816,906 A | 3/1989 | Kummerfeldt et al. | |
| 4,868,764 A | 9/1989 | Richards | |
| 4,891,748 A | 1/1990 | Mann | |

(Continued)

FOREIGN PATENT DOCUMENTS

| | | |
|---|---|---|
| EP | 0634873 B1 | 9/1998 |
| EP | 1351510 | 10/2003 |

(Continued)

OTHER PUBLICATIONS

"Series H: Audiovisual and Multimedia Systems; Infrastructure of audiovisual services—Coding of moving video; Advanced video coding for generic audiovisual services". H.264. Version 1. International Telecommunication Union. Dated May 2003.

(Continued)

*Primary Examiner* — Nhon Diep
(74) *Attorney, Agent, or Firm* — Young Basile Hanlon & MacFarlane P.C.

(57) ABSTRACT

A system and method for encoding and decoding a video image having a plurality of frames is disclosed. The method includes a previously reconstructed frame that is segmented to create an alternate reference frame used to encode a current frame. The segments of the previously reconstructed frame are assigned motion parameters, which are used to compile the alternate reference frame. The current frame is encoded and the segmentation parameters and motion parameters are transmitted in the bitstream. The segmentation parameters and motion parameters can be used by a decoder to recreate the alternate reference frame in order to decode the encoded current frame.

16 Claims, 8 Drawing Sheets

(56) References Cited

U.S. PATENT DOCUMENTS

| | | |
|---|---|---|
| 4,924,310 A | 5/1990 | von Brandt |
| 5,068,724 A | 11/1991 | Krause et al. |
| 5,083,214 A | 1/1992 | Knowles |
| 5,091,782 A | 2/1992 | Krause et al. |
| 5,136,371 A | 8/1992 | Savatier et al. |
| 5,136,376 A | 8/1992 | Yagasaki et al. |
| 5,148,269 A | 9/1992 | de Haan et al. |
| 5,164,819 A | 11/1992 | Music |
| 5,231,484 A | 7/1993 | Gonzales et al. |
| 5,270,812 A | 12/1993 | Richards |
| 5,274,442 A | 12/1993 | Murakami et al. |
| 5,313,306 A | 5/1994 | Kuban et al. |
| 5,337,086 A | 8/1994 | Fujinami |
| 5,341,440 A | 8/1994 | Earl et al. |
| 5,371,841 A | 12/1994 | Jones |
| 5,374,958 A | 12/1994 | Yanagihara |
| 5,389,068 A | 2/1995 | Keck |
| 5,398,068 A | 3/1995 | Liu et al. |
| 5,432,870 A | 7/1995 | Schwartz |
| 5,442,458 A | 8/1995 | Rabbani et al. |
| 5,461,423 A | 10/1995 | Tsukagoshi |
| 5,463,701 A | 10/1995 | Kantner, Jr. et al. |
| 5,483,287 A | 1/1996 | Siracusa |
| 5,512,952 A | 4/1996 | Iwamura |
| 5,561,475 A | 10/1996 | Jung |
| 5,561,477 A | 10/1996 | Polit |
| 5,568,200 A | 10/1996 | Pearlstein et al. |
| 5,576,767 A | 11/1996 | Lee et al. |
| 5,586,285 A | 12/1996 | Hasbun et al. |
| 5,589,945 A | 12/1996 | Abecassis |
| 5,596,370 A | 1/1997 | Jung |
| 5,659,539 A | 8/1997 | Porter et al. |
| 5,666,461 A | 9/1997 | Igarashi et al. |
| 5,686,962 A | 11/1997 | Chung et al. |
| 5,696,869 A | 12/1997 | Abecassis |
| 5,717,394 A | 2/1998 | Schwartz et al. |
| 5,731,840 A | 3/1998 | Kikuchi et al. |
| 5,734,744 A | 3/1998 | Wittenstein et al. |
| 5,737,020 A | 4/1998 | Hall et al. |
| 5,748,247 A | 5/1998 | Hu |
| 5,767,909 A | 6/1998 | Jung |
| 5,768,533 A | 6/1998 | Ran |
| 5,774,593 A | 6/1998 | Zick et al. |
| 5,777,680 A | 7/1998 | Kim |
| 5,793,647 A | 8/1998 | Hageniers et al. |
| 5,818,536 A | 10/1998 | Morris et al. |
| 5,818,969 A | 10/1998 | Astle |
| 5,828,370 A | 10/1998 | Moeller et al. |
| 5,886,742 A | 3/1999 | Hibi et al. |
| 5,903,264 A | 5/1999 | Moeller et al. |
| 5,926,226 A | 7/1999 | Proctor et al. |
| 5,929,940 A | 7/1999 | Jeannin |
| 5,930,379 A | 7/1999 | Rehg et al. |
| 5,930,493 A | 7/1999 | Ottesen et al. |
| 5,963,203 A | 10/1999 | Goldberg et al. |
| 5,991,447 A | 11/1999 | Eifrig et al. |
| 5,999,641 A | 12/1999 | Miller et al. |
| 5,999,655 A | 12/1999 | Kalker et al. |
| 6,005,980 A | 12/1999 | Eifrig et al. |
| 6,011,872 A | 1/2000 | Qian et al. |
| 6,014,706 A | 1/2000 | Cannon et al. |
| 6,026,183 A | 2/2000 | Talluri et al. |
| 6,035,060 A | 3/2000 | Chen et al. |
| 6,035,067 A | 3/2000 | Ponticos |
| 6,041,145 A | 3/2000 | Hayashi et al. |
| 6,055,330 A | 4/2000 | Eleftheriadis et al. |
| 6,061,397 A | 5/2000 | Ogura |
| 6,075,875 A * | 6/2000 | Gu .......................... 382/107 |
| 6,084,908 A | 7/2000 | Chiang et al. |
| 6,084,912 A * | 7/2000 | Reitmeier et al. ....... 375/240.11 |
| 6,108,383 A | 8/2000 | Miller et al. |
| 6,112,234 A | 8/2000 | Leiper |
| 6,115,501 A | 9/2000 | Chun et al. |
| 6,119,154 A | 9/2000 | Weaver et al. |
| 6,125,144 A | 9/2000 | Matsumura et al. |
| 6,141,381 A | 10/2000 | Sugiyama |
| 6,167,164 A | 12/2000 | Lee |
| 6,181,822 B1 | 1/2001 | Miller et al. |
| 6,185,363 B1 | 2/2001 | Dimitrova et al. |
| 6,188,799 B1 | 2/2001 | Tan et al. |
| 6,212,234 B1 | 4/2001 | Andoh et al. |
| 6,222,174 B1 * | 4/2001 | Tullis et al. ................ 250/208.1 |
| 6,236,682 B1 * | 5/2001 | Ota et al. .................. 375/240.16 |
| 6,240,135 B1 | 5/2001 | Kim |
| 6,249,613 B1 | 6/2001 | Crinon et al. |
| 6,249,614 B1 | 6/2001 | Kolesnik et al. |
| 6,256,423 B1 | 7/2001 | Krishnamurthy et al. |
| 6,272,179 B1 | 8/2001 | Kadono |
| 6,275,614 B1 | 8/2001 | Krishnamurthy et al. |
| 6,289,049 B1 | 9/2001 | Kim et al. |
| 6,292,837 B1 | 9/2001 | Miller et al. |
| 6,327,304 B1 | 12/2001 | Miller et al. |
| 6,337,917 B1 | 1/2002 | Onural et al. |
| 6,359,929 B1 | 3/2002 | Boon |
| 6,370,267 B1 | 4/2002 | Miller et al. |
| 6,377,709 B1 | 4/2002 | Guillotel |
| 6,381,277 B1 | 4/2002 | Chun et al. |
| 6,400,763 B1 | 6/2002 | Wee |
| 6,414,995 B2 | 7/2002 | Okumura et al. |
| 6,418,166 B1 | 7/2002 | Wu et al. |
| 6,427,028 B1 | 7/2002 | Donescu et al. |
| 6,473,463 B2 | 10/2002 | Agarwal |
| 6,501,860 B1 | 12/2002 | Charrier et al. |
| 6,522,784 B1 | 2/2003 | Zlotnick |
| 6,526,097 B1 | 2/2003 | Sethuraman et al. |
| 6,529,638 B1 | 3/2003 | Westerman |
| 6,560,366 B1 | 5/2003 | Wilkins |
| 6,570,924 B1 | 5/2003 | Lynch et al. |
| 6,658,618 B1 | 12/2003 | Gu et al. |
| 6,661,842 B1 | 12/2003 | Abousleman |
| 6,661,925 B1 | 12/2003 | Pianykh et al. |
| 6,687,303 B1 | 2/2004 | Ishihara |
| 6,697,061 B1 | 2/2004 | Wee et al. |
| 6,707,952 B1 | 3/2004 | Tan et al. |
| 6,711,211 B1 | 3/2004 | Lainema |
| 6,735,249 B1 | 5/2004 | Karczewicz et al. |
| 6,754,266 B2 | 6/2004 | Bahl et al. |
| 6,757,434 B2 | 6/2004 | Miled et al. |
| 6,765,964 B1 | 7/2004 | Conklin |
| 6,774,924 B2 | 8/2004 | Kato et al. |
| 6,774,929 B1 | 8/2004 | Kopp |
| 6,826,229 B2 | 11/2004 | Kawashima et al. |
| 6,909,749 B2 * | 6/2005 | Yang et al. ................ 375/240.16 |
| 6,934,419 B2 | 8/2005 | Zlotnick |
| 6,985,526 B2 | 1/2006 | Bottreau et al. |
| 6,985,527 B2 | 1/2006 | Gunter et al. |
| 6,987,866 B2 | 1/2006 | Hu |
| 7,010,032 B1 | 3/2006 | Kikuchi et al. |
| 7,027,506 B2 | 4/2006 | Lee et al. |
| 7,027,654 B1 | 4/2006 | Ameres et al. |
| 7,076,113 B2 | 7/2006 | Le Dinh |
| 7,085,319 B2 * | 8/2006 | Prakash et al. ............ 375/240.08 |
| 7,116,831 B2 | 10/2006 | Mukerjee et al. |
| 7,136,534 B2 | 11/2006 | Thyagarajan et al. |
| 7,143,352 B2 | 11/2006 | Divakaran et al. |
| 7,170,937 B2 | 1/2007 | Zhou |
| 7,221,710 B2 | 5/2007 | Lee |
| 7,226,150 B2 | 6/2007 | Yoshimura et al. |
| 7,227,977 B1 | 6/2007 | Dotsenko |
| 7,236,524 B2 | 6/2007 | Sun et al. |
| 7,253,831 B2 | 8/2007 | Gu |
| 7,263,125 B2 | 8/2007 | Lainema |
| 7,330,509 B2 | 2/2008 | Lu et al. |
| 7,406,053 B2 | 7/2008 | Cheung et al. |
| 7,499,492 B1 | 3/2009 | Ameres et al. |
| 7,529,199 B1 | 5/2009 | Wijnands et al. |
| 7,532,808 B2 | 5/2009 | Lainema |
| 7,599,435 B2 | 10/2009 | Marpe et al. |
| 7,606,310 B1 | 10/2009 | Ameres et al. |
| 7,671,894 B2 | 3/2010 | Yea et al. |
| 7,728,840 B2 | 6/2010 | Hung |
| 7,734,821 B2 | 6/2010 | Wang et al. |
| 7,773,677 B2 | 8/2010 | Lee |
| 8,116,374 B2 | 2/2012 | Gordon et al. |

(56) References Cited

U.S. PATENT DOCUMENTS

| | | |
|---|---|---|
| 8,155,454 B2 | 4/2012 | Raveendran |
| 8,233,676 B2 | 7/2012 | Ngan et al. |
| 8,243,797 B2 | 8/2012 | Lin et al. |
| 2001/0022815 A1 | 9/2001 | Agarwal |
| 2002/0012471 A1 | 1/2002 | Nayyar |
| 2002/0031272 A1 | 3/2002 | Bagni et al. |
| 2002/0036705 A1 | 3/2002 | Lee et al. |
| 2002/0071485 A1 | 6/2002 | Caglar et al. |
| 2002/0080871 A1 | 6/2002 | Fallon et al. |
| 2002/0136448 A1 | 9/2002 | Bortolussi et al. |
| 2002/0168114 A1 | 11/2002 | Valente |
| 2002/0172289 A1 | 11/2002 | Akiyoshi et al. |
| 2003/0081850 A1 | 5/2003 | Karczewicz et al. |
| 2003/0095598 A1 | 5/2003 | Lee et al. |
| 2003/0123545 A1 | 7/2003 | Prakash et al. |
| 2003/0161399 A1 | 8/2003 | Ali |
| 2003/0165331 A1 | 9/2003 | Van Der Schaar |
| 2003/0202594 A1 | 10/2003 | Lainema |
| 2003/0215014 A1 | 11/2003 | Koto et al. |
| 2004/0013308 A1 | 1/2004 | Jeon et al. |
| 2004/0042549 A1 | 3/2004 | Huang et al. |
| 2004/0080669 A1 | 4/2004 | Nagai et al. |
| 2004/0120398 A1 | 6/2004 | Zhang et al. |
| 2004/0120400 A1 | 6/2004 | Linzer |
| 2004/0131117 A1 | 7/2004 | Sheraizin et al. |
| 2004/0156549 A1 | 8/2004 | Persiantsev |
| 2004/0179820 A1 | 9/2004 | Kashiwagi et al. |
| 2004/0184533 A1 | 9/2004 | Wang |
| 2004/0202252 A1 | 10/2004 | Lee |
| 2004/0208392 A1 | 10/2004 | Raveendran et al. |
| 2004/0228410 A1 | 11/2004 | Ameres et al. |
| 2004/0240556 A1 | 12/2004 | Winger et al. |
| 2004/0252886 A1 | 12/2004 | Pan et al. |
| 2005/0008240 A1 | 1/2005 | Banerji et al. |
| 2005/0013494 A1 | 1/2005 | Srinivasan et al. |
| 2005/0046702 A1 | 3/2005 | Katayama et al. |
| 2005/0111744 A1 | 5/2005 | Kupeev et al. |
| 2005/0123056 A1 | 6/2005 | Wang et al. |
| 2005/0147165 A1 | 7/2005 | Yoo et al. |
| 2005/0152456 A1 | 7/2005 | Orchard et al. |
| 2005/0169374 A1 | 8/2005 | Marpe et al. |
| 2005/0180506 A1 | 8/2005 | Wittebrood et al. |
| 2005/0206785 A1 | 9/2005 | Swan et al. |
| 2005/0226321 A1 | 10/2005 | Chen |
| 2005/0232351 A1 | 10/2005 | Jung |
| 2005/0265447 A1 | 12/2005 | Park |
| 2005/0276497 A1 | 12/2005 | Chen et al. |
| 2005/0286629 A1 | 12/2005 | Dumitras et al. |
| 2006/0050695 A1 | 3/2006 | Wang |
| 2006/0062481 A1 | 3/2006 | Suvanto |
| 2006/0098737 A1 | 5/2006 | Sethuraman et al. |
| 2006/0098738 A1 | 5/2006 | Cosman et al. |
| 2006/0114996 A1 | 6/2006 | Thoreau et al. |
| 2006/0126734 A1 | 6/2006 | Wiegand et al. |
| 2006/0126739 A1 | 6/2006 | Stoner |
| 2006/0155398 A1 | 7/2006 | Hoffberg et al. |
| 2006/0198443 A1 | 9/2006 | Liang et al. |
| 2006/0215758 A1 | 9/2006 | Kawashima |
| 2006/0239345 A1 | 10/2006 | Taubman et al. |
| 2006/0257048 A1 | 11/2006 | Lin et al. |
| 2006/0285598 A1 | 12/2006 | Tulkki |
| 2007/0009034 A1 | 1/2007 | Tulkki |
| 2007/0076947 A1 | 4/2007 | Wang et al. |
| 2007/0092010 A1 | 4/2007 | Huang et al. |
| 2007/0109409 A1 | 5/2007 | Yea et al. |
| 2007/0110290 A1 | 5/2007 | Chang et al. |
| 2007/0115156 A1 | 5/2007 | Lim et al. |
| 2007/0130755 A1 | 6/2007 | Duquette et al. |
| 2007/0140342 A1 | 6/2007 | Karczewicz et al. |
| 2007/0140346 A1 | 6/2007 | Chen et al. |
| 2007/0165958 A1 | 7/2007 | Picard |
| 2007/0171974 A1 | 7/2007 | Baik |
| 2007/0177665 A1 | 8/2007 | Zhou et al. |
| 2007/0199011 A1 | 8/2007 | Zhang et al. |
| 2007/0206673 A1 | 9/2007 | Cipolli et al. |
| 2007/0236513 A1 | 10/2007 | Hedenstroem et al. |
| 2008/0008398 A1 | 1/2008 | Tanaka et al. |
| 2008/0056347 A1 | 3/2008 | Chiu et al. |
| 2008/0112486 A1 | 5/2008 | Takahashi et al. |
| 2008/0115185 A1 | 5/2008 | Qiu et al. |
| 2008/0130755 A1 | 6/2008 | Loukas et al. |
| 2008/0151997 A1 | 6/2008 | Oguz |
| 2008/0152245 A1 | 6/2008 | El-Maleh et al. |
| 2008/0170793 A1 | 7/2008 | Yamada et al. |
| 2008/0175475 A1 | 7/2008 | Sung |
| 2008/0212678 A1 | 9/2008 | Booth et al. |
| 2008/0219351 A1 | 9/2008 | Kim et al. |
| 2008/0246884 A1 | 10/2008 | Chung |
| 2009/0034619 A1 | 2/2009 | Mukherjee et al. |
| 2009/0103610 A1 | 4/2009 | Puri |
| 2009/0103617 A1 | 4/2009 | Au et al. |
| 2009/0122859 A1 | 5/2009 | Yasuda |
| 2009/0161938 A1 | 6/2009 | Shekhar et al. |
| 2009/0226044 A1 | 9/2009 | Ngan et al. |
| 2009/0262835 A1 | 10/2009 | Srinivasan et al. |
| 2009/0296814 A1 | 12/2009 | Lin et al. |
| 2010/0054344 A1 | 3/2010 | Puri et al. |
| 2010/0061444 A1 | 3/2010 | Wilkins et al. |
| 2010/0061461 A1 | 3/2010 | Bankoski et al. |
| 2010/0086027 A1 | 4/2010 | Panchal et al. |
| 2010/0104016 A1 | 4/2010 | Aoki |
| 2010/0208812 A1 | 8/2010 | Murakami et al. |
| 2010/0239015 A1 | 9/2010 | Wang et al. |
| 2010/0246939 A1 | 9/2010 | Aisaka et al. |
| 2010/0246951 A1 | 9/2010 | Chen et al. |
| 2010/0272173 A1 | 10/2010 | Puri et al. |
| 2010/0278271 A1 | 11/2010 | MacInnis |
| 2010/0303150 A1 | 12/2010 | Hsiung et al. |
| 2010/0328538 A1 | 12/2010 | Al-Kadi et al. |
| 2011/0007977 A1 | 1/2011 | Amonou et al. |
| 2011/0069751 A1 | 3/2011 | Budagavi |
| 2011/0182352 A1 | 7/2011 | Pace |
| 2011/0182509 A1 | 7/2011 | Free |
| 2011/0188579 A1 | 8/2011 | Lin et al. |
| 2011/0249756 A1 | 10/2011 | Doepke |
| 2012/0155532 A1 | 6/2012 | Puri et al. |
| 2013/0022099 A1* | 1/2013 | Liu et al. .................. 375/240.01 |
| 2013/0148729 A1 | 6/2013 | Sasai et al. |

FOREIGN PATENT DOCUMENTS

| | | |
|---|---|---|
| EP | 1496706 | 1/2005 |
| GB | 2350515 | 11/2000 |
| GB | 2371434 | 7/2002 |
| GB | 2403618 | 1/2005 |
| JP | 2217088 | 8/1990 |
| JP | 8280032 | 10/1996 |
| JP | 11262018 | 9/1999 |
| JP | 11289544 | 10/1999 |
| JP | 11313332 | 11/1999 |
| JP | 11513205 | 11/1999 |
| JP | 2007036888 | 2/2007 |
| KR | 100213018 | 8/1999 |
| KR | 20010030916 | 4/2001 |
| KR | 20060035542 | 4/2006 |
| WO | WO0150770 | 7/2001 |
| WO | WO0207164 | 1/2002 |
| WO | WO03026315 | 3/2003 |
| WO | WO03041405 | 5/2003 |
| WO | WO03084235 | 10/2003 |
| WO | WO2006078115 | 7/2006 |
| WO | WO2008002491 | 1/2008 |
| WO | WO2008008331 | 1/2008 |

OTHER PUBLICATIONS

"Series H: Audiovisual and Multimedia Systems; Infrastructure of audiovisual services—Coding of moving video; Advanced video coding for generic audiovisual services". H.264. Version 3. International Telecommunication Union. Dated Mar. 2005.

"Overview; VP7 Data Format and Decoder". Version 1.5. On2 Technologies, Inc. Dated Mar. 28, 2005.

(56) References Cited

OTHER PUBLICATIONS

"Series H: Audiovisual and Multimedia Systems; Infrastructure of audiovisual services—Coding of moving video; Advanced video coding for generic audiovisual services". H.264. Amendment 1: Support of additional colour spaces and removal of the High 4:4:4 Profile. International Telecommunication Union. Dated Jun. 2006.
"VP6 Bitstream & Decoder Specification". Version 1.02. On2 Technologies, Inc. Dated Aug. 17, 2006.
"Series H: Audiovisual and Multimedia Systems; Infrastructure of audiovisual services—Coding of moving video". H.264. Amendment 2: New profiles for professional applications. International Telecommunication Union. Dated Apr. 2007.
"VP6 Bitstream & Decoder Specification". Version 1.03. On2 Technologies, Inc. Dated Oct. 29, 2007.
"Series H: Audiovisual and Multimedia Systems; Infrastructure of audiovisual services—Coding of moving video". H.264. Advanced video coding for generic audiovisual services. Version 8. International Telecommunication Union. Dated Nov. 1, 2007.
"Series H: Audiovisual and Multimedia Systems; Infrastructure of audiovisual services—Coding of moving video". H.264. Advanced video coding for generic audiovisual services. International Telecommunication Union. Version 11. Dated Mar. 2009.
"Series H: Audiovisual and Multimedia Systems; Infrastructure of audiovisual services—Coding of moving video". H.264. Advanced video coding for generic audiovisual services. International Telecommunication Union. Version 12. Dated Mar. 2010.
"Implementors' Guide; Series H: Audiovisual and Multimedia Systems; Coding of moving video: Implementors Guide for H.264: Advanced video coding for generic audiovisual services". H.264. International Telecommunication Union. Version 12. Dated Jul. 30, 2010.
"VP8 Data Format and Decoding Guide". WebM Project. Google On2. Dated: Dec. 1, 2010.
Carreira, Joao et al. "Constrained Parametric Min-Cuts for Automatic Object Segmentation", 2010 IEEE Conference on Computer Vision and Pattern Recognition (CVPR), San Francisco, CA, Jun. 13-18, 2010.
International Search Report and Written Opinion for International Patent Application PCT/US2012/031579; dated Jun. 21, 2012.
Nokia, Inc., Nokia Research Center, "MVC Decoder Description", Telecommunication Standardization Sector, Study Period 1997-2000, Geneva, Feb. 7, 2000, 99 pp.
Series H: Audiovisual and Multimedia Systems, "Infrastructure of audiovisual services—Coding of moving video, Video coding for low bit rate communication", International Telecommunication Union, ITU-T Recommendation H.263, Feb. 1998, 167 pp.
Stiller, Christoph; "Motion-Estimation for Coding of Moving Video at 8 kbit/s with Gibbs Modeled Vectorfield Smoothing", SPIE vol. 1360 Visual Communications and Image Processing 1990, 9 pp.
Chen, Xing C., et al.; "Quadtree Based Adaptive Lossy Coding of Motion Vectors", IEEE 1996, 4 pp.
Wright, R. Glenn, et al.; "Multimedia—Electronic Technical Manual for ATE", IEEE 1996, 3 pp.
Schiller, H., et al.; "Efficient Coding of Side Information in a Low Bitrate Hybrid Image Coder", Signal Processing 19 (1990) Elsevier Science Publishers B.V. 61-73, 13 pp.
Strobach, Peter; "Tree-Structured Scene Adaptive Coder", IEEE Transactions on Communications, vol. 38, No. 4, Apr. 1990, 10 pp.
Steliaros, Michael K., et al.; "Locally-accurate motion estimation for object-based video coding", SPIE vol. 3309, 1997, 11 pp.
Martin, Graham R., et al.; "Reduced Entropy Motion Compensation Using Variable Sized Blocks", SPIE vol. 3024, 1997, 10 pp.
Schuster, Guido M., et al.; "A Video Compression Scheme With Optimal Bit Allocation Among Segmentation, Motion, and Residual Error", IEEE Transactions on Image Processing, vol. 6, No. 11, Nov. 1997, 16 pp.
Liu, Bede, et al.; "New Fast Algorithms for the Estimation of Block Motion Vectors", IEEE Transactions on Circuits and Systems for Video Technology, vol. 3, No. 2, Apr. 1993, 10 pp.

Kim, Jong Won, et al.; "On the Hierarchical Variable Block Size Motion Estimation Technique for Motion Sequence Coding", SPIE Visual Communication and Image Processing 1993, Cambridge, MA, Nov. 8, 1993, 29 pp.
Guillotel, Philippe, et al.; "Comparison of motion vector coding techniques", SPIE vol. 2308, 1994, 11 pp.
Orchard, Michael T.; "Exploiting Scene Structure in Video Coding", IEEE 1991, 5 pp.
Liu, Bede, et al.; "A simple method to segment motion field for video coding", SPIE vol. 1818, Visual Communications and Image Processing 1992, 10 pp.
Ebrahimi, Touradj, et al.; "Joint motion estimation and segmentation for very low bitrate video coding", SPIE vol. 2501, 1995, 12 pp.
Karczewicz, Maria, et al.; "Video Coding Using Motion Compensation With Polynomial Motion Vector Fields", IEEE COMSOC EURASIP, First International Workshop on Wireless Image/Video Communications—Sep. 1996, 6 pp.
Wiegand, Thomas, et al.; "Rate-Distortion Optimized Mode Selection for Very Low Bit Rate Video Coding and the Emerging H.263 Standard", IEEE Transactions on Circuits and Systems for Video Technology, vol. 6, No. 2, Apr. 1996, 9 pp.
Wiegand, Thomas, et al.; "Long-Term Memory Motion-Compensated Prediction", Publication Unknown, Date Unknown, 15 pp.
Zhang, Kui, et al.; "Variable Block Size Video Coding With Motion Prediction and Motion Segmentation", SPIE vol. 2419, 1995, 9 pp.
Chen, Michael C., et al.; "Design and Optimization of a Differentially Coded Variable Block Size Motion Compensation System", IEEE 1996, 4 pp.
Orchard, Michael T.; "Predictive Motion-Field Segmentation for Image Sequence Coding", IEEE Transactions on Circuits and Systems for Video Technology, vol. 3, No. 1, Feb. 1993, 17 pp.
Nicolas, H., et al.; "Region-based motion estimation using deterministic relaxation schemes for image sequence coding", IEEE 1992, 4 pp.
Luttrell, Max, et al.; "Simulation Results for Modified Error Resilient Syntax With Data Partitioning and RVLC", ITU-Telecommunications Standardization Sector, Study Group 16, Video Coding Experts Group (Question 15), Sixth Meeting: Seoul, South Korea, Nov. 2, 1998, 34 pp.
ISO/IEC: "information Technology—Coding of audio-visual objects" Retrieved from the Internet: Http://kazus.ru/nuke/modules/downloads/pub/144/0/ISO-IEC-14496-2-2001.
Pascal Fleury et al: "MPEG-4 video verification model: A solution for interactive multimedia applications" Journal of Electronic Imaging, SPIE/IS&T; Engineering Information Inc.; vol. 7, Jul. 1, 1998, pp. 502-515.
Sun Y et al, Asynchronous Rate Control for Multi-Object Videos, IEEE Transactions on Circuits and Systems for Video Technology, Aug. 1, 2005, pp. 1007-1018, vol. 15, No. 8 [retrieved from Internet on Jul. 19, 2011] <URL: http://ieeexplore.ieee.org/stamp/stamp.jsp?tp=&arnumber=1490554>.
Bo Hong: "Introduction to H.264", Internet citation, XP002952898, pp. 5, 14-15.
Borman S. et al., "Super-Resolution From Image Sequences—A Review", Proceedings of Midwest Symposium on Circuits and Systems, pp. 374-378, Aug. 9, 1998.
Feng Wu et al, "Efficient Background Video Coding with Static Sprite Generation and Arbitrary-Shape Spatial Prediction Techniques", IEEE Transactions on Circuits and Systems for Video Technology, vol. 13, No. 5, pp. 394-405, May 1, 2003.
Girod B. et al., "3-D Image Models and Compression: Synthetic Hybrid or Natural Fit?", International Conference on Image Processing, vol. 2, pp. 525-529, Oct. 24, 1999.
Hiroshi Watanabe et al, "Sprite Coding in Object-Based Video Coding Standard: MPEG-4", Proceedings of Multiconference on Systemics, Cybernetics and Informatics, vol. 13, pp. 420-425, Jul. 1, 2001.
International Search Report dated Apr. 20, 2010 from the corresponding International Application No. PCT/US2009/056448.
International Search Report for related matter PCT/US2013/037058 mailed Dec. 16, 2013.

(56) References Cited

OTHER PUBLICATIONS

Irani M et al, "Video Compression Using Mosaic Representations", Signal Processing Image Communication, vol. 7 No. 4., pp. 529-552, Nov. 1, 1995.

"Liu, P., et al, ""A fast and novel intra and inter modes decision prediction algorithm for H.264/AVC based-on the characteristics of* u macro-block"", 2009 Fifth Inti. Confr. on Intelligent Information Hiding and Multimedia Signal Processing, pp. 286-289,http:/ /i eeexplore. ieee .o rg/s tamp/stamp .jsp ?tp=&arn umber =533 7 483".

On2 Technologies Inc., White Paper TrueMotion VP7 Video Codec, Jan. 10, 2005, 13 pages, Document Version: 1.0, Clifton Park, New York.

Zhi Liu, Zhaoyang Zhang, Liquan Shen, Mosaic Generation in H.264 Compressed Domain, IEEE 2006.

Park, Jun Sung, et al., "Selective Intra Prediction Mode Decision for H.264/AVC Encoders", World Academy of Science, Engineering and Technology 13, (2006).

Sjoberg R. et al/ "Absolute signaling of refrence pictures", 6 JCT-VC Meeting; 97. MPEG Meeting; Jul. 14, 2011-Jul. 22, 2011; Torinino (Joint Collaborative Team on Video Coding of ISO/*EC JTC1/Sc29/WG11 and ITU-T SG. 16).

Wiegand, Thomas, Study of Final Committee Draft of Joint Video Specification (ITU-T Rec. H.264 | ISO/IEC 14496-10 AVC), Joint Video Team (JVT) of ISO/IEC MPEG & ITU-T VCEG (ISO/IEC JTC1/SC29/WG11 and ITU-T SG16 Q.6), JVT-F100, Dec. 5, 2002.

Written Opinion of the International Searching Authority dated Aug. 3, 2010 from the corresponding International Application No. PCT/US2009/056448 filed Sep. 10, 2009.

Chen et al. (Predictive Video Decosing Based on Ordinal Depth of Moing Regions, IEEE Proceedings of ICC 2010).

Flexible Macroblock Ordering; Wikipedia; Jul. 15, 2008.

Giovani Gomez, et al. Automatic feature constructions and a simple rule induction algorithm for skin detection, itesm capus cuernavaca, paseo de la reforma 182 A, Temixo, Morelos 62589, Mexico, 8 pages.

Jure Kovac, et al., Human Skin Colour Clustering for Face Detection, University of Ljubljana, Slovenia, 5 pages.

Lee et al, Bit Allocation for MPEG-4 Video Coding with Spatio-Temporal Tradeoffs, Jun. 2003, pp. 488-502, [retrieved from Internet on Jul. 19, 2011] <URL:http://ieeexplore.ieee.org/stamp/stamp.jsp?tp=&arnumber=1207406>.

M. Bierling, Displacement estimation by hierarchical blockmatching. 1998, in Proceedings of SPIE Visual Communications and Image Processing 88, p. 942-951.

Marcos Nieto, Luis Salgado, Narciso Garcia; Fast Mode Decision Based on Activity Segmentation in H.264/AVC Encoding; Grupo de Tratamiento de Imagenes—E.T.S. Ingenieros de Telecomunicacion, Universidad Politecnica de Madrid, Spain; Springer-Verlag Berlin Heidelberg 2006.

Moschetti et al, Automatic Object Extraction and Dynamic Bitrate Allocation for Second Generation Video Coding, Multimedia and Expo, 2002. ICME '02 Proceedings. 2002 IEEE International Conference on Lausanne, Switzerland, Aug. 26, 2002, pp. 493-496, vol. 1,Piscataway, New Jersey, USA.

Nunes P et al, Rate Control for Scenes with Multiple Arbitrarily Shaped Video Objects, ITG Fachberichte, Jan. 1, 1997, pp. 303-308, Berlin, Germany.

Paul et al. ("Video coding focusing on block partitioning and occlusion," IEEE Transactions on Image Processing, vol. 19, No. 3, Mar. 2010, 691-701)—discloses pattern-based coding that divides a frame using different block shapes and sizes.

Sikora, T. et al., Shape-adaptive DCT for generic coding of video, Circuits and Systems for Video Technology, IEEE Transactions on vol. 5, Issue 1, p. 59-62, Feb. 1, 1995.

Tarek Mahmound, A new fast skin color detection technique, Worl Academy of Science, Engineering and Technology 43 2008, 5 pages.

Vladimir Vezhnevets, et al., A Survey on Pixel Based Skin Color Detection Techniques, Graphics and Media Laboratory, Moscow Russia, 8 pages.

Wiegand et al, "Overview of the H 264/AVC Video Coding Standard," IEEE Transactions on Circuits and Systems for Video Technology, vol. 13, No. 7, pp. 568, 569, Jul. 1, 2003.

Chong Soon Lim et al. Reference Lists for B Pictures Under Low Delay Constraints, 95. MPEG Meeting; Jan. 24, 2011; Jan. 21, 2011.

IPRP for PCT/US2013/037058 from related application mailed Nov. 6, 2014.

\* cited by examiner

ENCODING AND DECODING MOTION VIA IMAGE SEGMENTATION

TECHNICAL FIELD

The present invention relates in general to video encoding and decoding.

BACKGROUND

An increasing number of applications today make use of digital video for various purposes including, for example, remote business meetings via video conferencing, high definition video entertainment, video advertisements, and sharing of user-generated videos. As technology is evolving, users have higher expectations for video quality and expect high resolution video even when transmitted over communications channels having limited bandwidth.

To permit higher quality transmission of video while limiting bandwidth consumption, a number of video compression schemes are noted including formats such as VPx, promulgated by Google Inc. of Mountain View, Calif., and H.264, a standard promulgated by ITU-T Video Coding Experts Group (VCEG) and the ISO/IEC Moving Picture Experts Group (MPEG), including present and future versions thereof. H. 264 is also known as MPEG-4 Part 10 or MPEG-4 AVC (formally, ISO/IEC 14496-10).

These compression schemes may use prediction techniques to minimize the amount of data required to transmit video information by using, for example, the spatial and temporal coherences in video information. Prediction techniques can allow for multiple past transmitted frames and future frames to be used as potential reference frame predictors for macroblocks in a frame.

SUMMARY

Systems, apparatuses and methods for encoding and decoding a video signal are disclosed. In accordance with one aspect of the disclosed embodiments, a method for encoding a current frame of a video signal having a plurality of frames, each frame having a plurality of pixels, is disclosed. One such method comprises segmenting a previously reconstructed frame into at least one image segment using a segmentation parameter, each image segment having a segment identifier, determining a motion parameter for each image segment using a processor, creating an alternate reference frame from the previously reconstructed frame using the motion parameter for at least certain of the image segments, and encoding the current frame using the alternate reference frame for inclusion in a bitstream.

An apparatus for encoding a current frame of a video signal having a plurality of frames, each frame having a plurality of pixels, includes in one exemplary embodiment means for segmenting a previously reconstructed frame into at least one image segment using a segmentation parameter, each image segment having a segment identifier, means for determining a motion parameter for each image segment, means for creating an alternate reference frame from the previously reconstructed frame using the motion parameter for each image segment, and means for encoding the current frame using the alternate reference frame for inclusion in a bitstream.

One method for decoding a video signal having a plurality of frames taught herein, where each frame has a plurality of pixels, comprises identifying a current frame to be decoded from a bitstream using a processor, the current frame having an associated previously reconstructed frame, a segmentation parameter, a plurality of segment identifiers and a motion parameter associated with each segment identifier, segmenting the previously reconstructed frame into a plurality of image segments using the segmentation parameter, each image segment associated with one of the segment identifiers, creating an alternate reference frame from the previously reconstructed frame using the motion parameter of at least certain of the image segments, and decoding the current frame using the alternate reference frame.

Variations of these methods and apparatuses and details of other aspects and embodiments are described in additional detail hereinafter.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
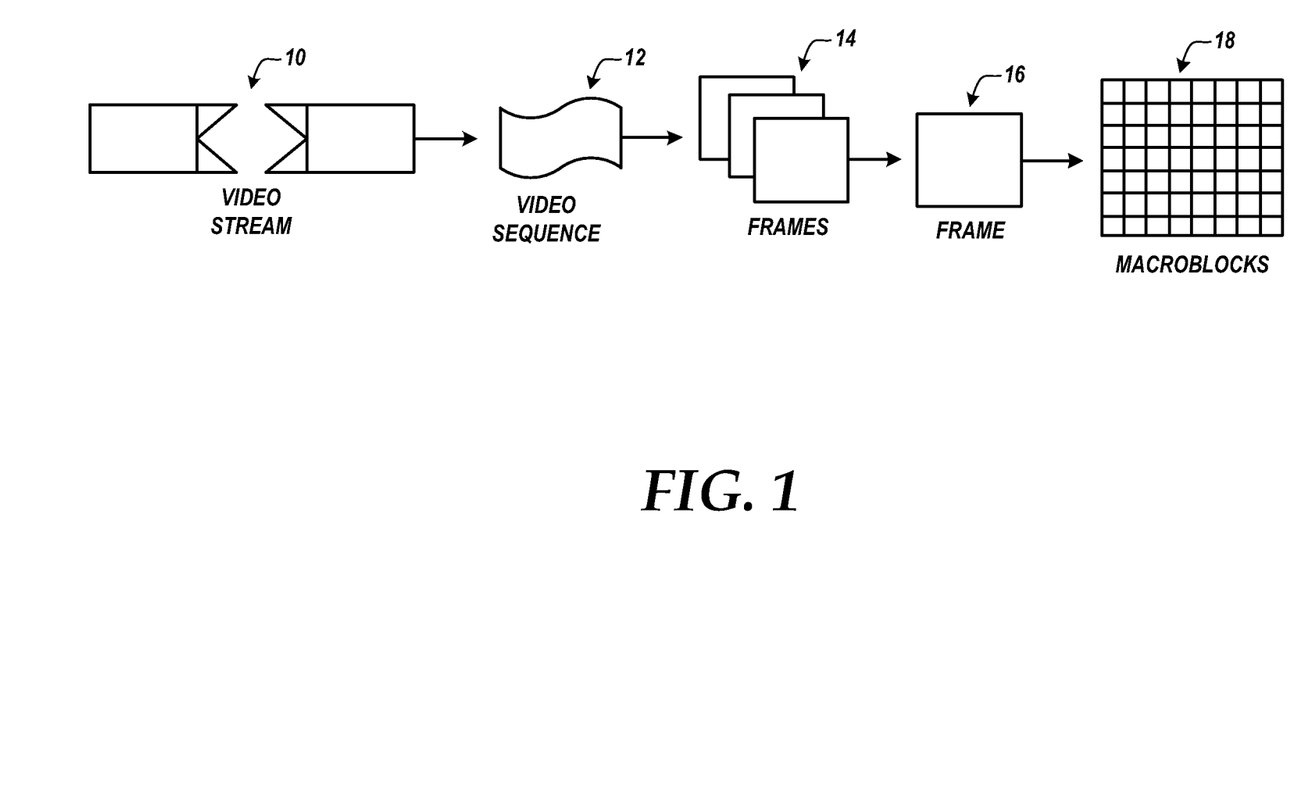
FIG. 1 is a diagram of a video bitstream.

FIG. 1 is a diagram a typical video bitstream 10 to be encoded and decoded. Video coding formats, such as VP8 or H.264, provide a defined hierarchy of layers for video stream 10. Video stream 10 includes a video sequence 12. At the next level, video sequence 12 consists of a number of adjacent frames 14, which can then be further subdivided into a single frame 16. At the next level, frame 16 can be divided into a series of blocks or macroblocks 18, which can contain data corresponding to, for example, a 16×16 block of displayed pixels in frame 16. Each macroblock can contain luminance and chrominance data for the corresponding pixels. Macroblocks 18 can also be of any other suitable size such as 16×8 pixel groups or 8×16 pixel groups. Herein, unless otherwise stated, the terms macroblocks and blocks are used interchangeably.

Figure 2:
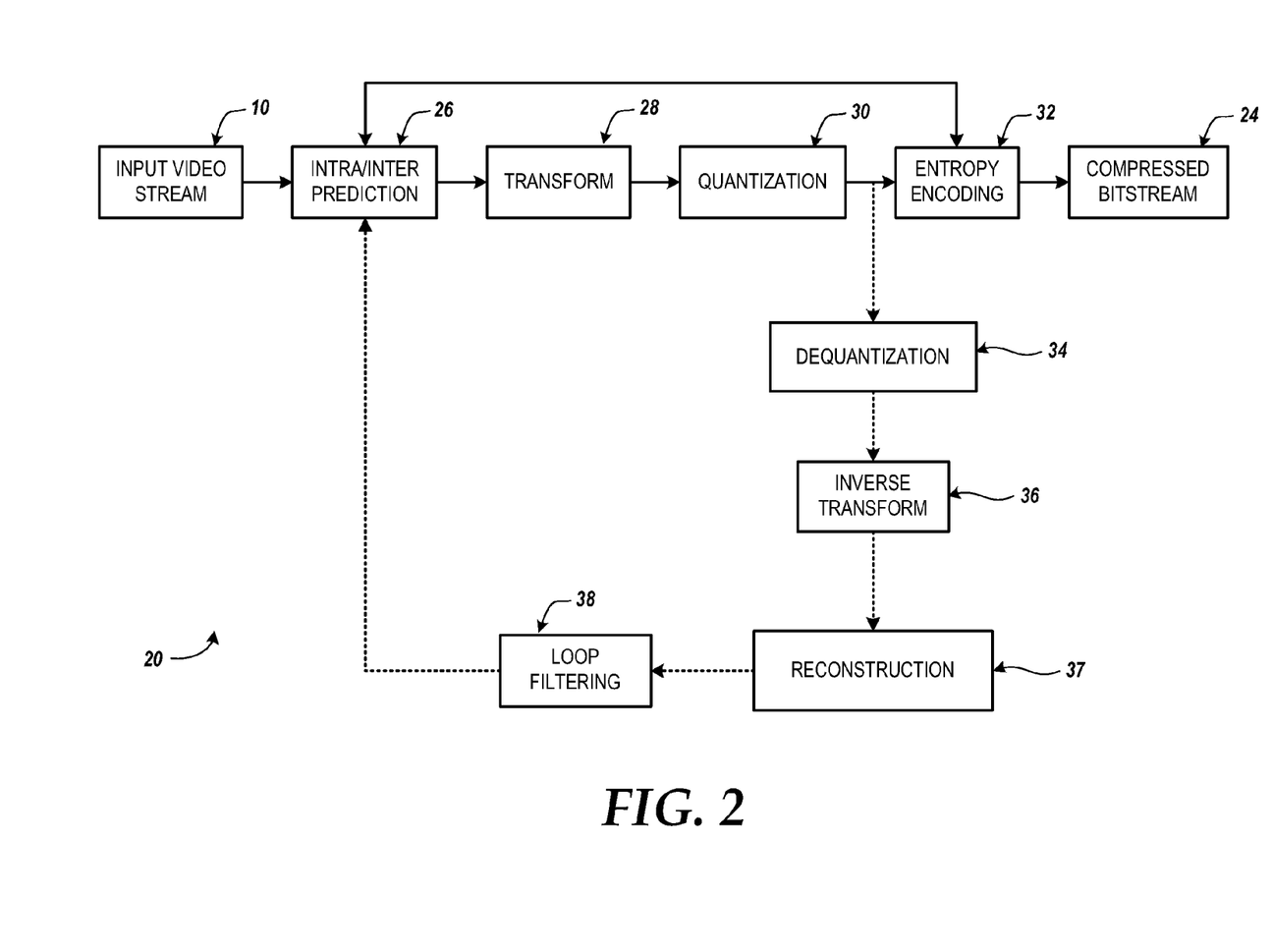
FIG. 2 is a block diagram of a video compression system in accordance with one embodiment.

FIG. 2 is a block diagram of a video compression system in accordance with one embodiment. An encoder 20 encodes an input video stream 10. Encoder 20 has the following stages to perform the various functions in a forward path (shown by the solid connection lines) to produce an encoded or a compressed bitstream 24: an intra/inter prediction stage 26, a transform stage 28, a quantization stage 30 and an entropy encoding stage 32. Encoder 20 also includes a reconstruction path (shown by the dotted connection lines) to reconstruct a frame for encoding of further macroblocks. Encoder 20 has the following stages to perform the various functions in the reconstruction path: a dequantization stage 34, an inverse transform stage 36, a reconstruction stage 37 and a loop filtering stage 38. Other structural variations of encoder 20 can be used to encode input video stream 10.

When input video stream 10 is presented for encoding, each frame 16 within input video stream 10 is processed in units of macroblocks. At intra/inter prediction stage 26, each macroblock can be encoded using either intra-frame prediction (i.e., within a single frame) or inter-frame prediction (i.e. from frame to frame). In either case, a prediction macroblock can be formed. In the case of intra-prediction, a prediction macroblock can be formed from samples in the current frame that have been previously encoded and reconstructed. In the case of inter-prediction, a prediction macroblock can be formed from samples in one or more previously constructed reference frames as described in additional detail herein.

Next, still referring to FIG. 2, the prediction macroblock can be subtracted from the current macroblock at stage 26 to produce a residual macroblock (residual). Transform stage 28 transforms the residual into transform coefficients in, for example, the frequency domain, and quantization stage 30 converts the transform coefficients into discrete quantum values, which are referred to as quantized transform coefficients or quantization levels. The quantized transform coefficients are then entropy encoded by entropy encoding stage 32. The entropy-encoded coefficients, together with the information required to decode the macroblock, such as the type of prediction used, motion vectors, and quantizer value, are then output to compressed bitstream 24.

The reconstruction path in FIG. 2 is present to ensure that both encoder 20 and a decoder 42 (described below) use the same reference frames to decode compressed bitstream 24. The reconstruction path performs functions that are similar to functions that take place during the decoding process that are discussed in more detail below, including dequantizing the quantized transform coefficients at dequantization stage 34 and inverse transforming the dequantized transform coefficients at an inverse transform stage 36 in order to produce a derivative residual macroblock (derivative residual). At reconstruction stage 37, the prediction macroblock that was predicted at intra/inter prediction stage 26 can be added to the derivative residual to create a reconstructed macroblock. A loop filter 38 can then be applied to the reconstructed macroblock to reduce distortion such as blocking artifacts.

Other variations of encoder 20 can be used to encode compressed bitstream 24. For example, a non-transform based encoder can quantize the residual signal directly without transform stage 28. In another embodiment, an encoder may have quantization stage 30 and dequantization stage 34 combined into a single stage. In yet another embodiment, a temporal filter may be included with the intra/inter prediction stage 24.

The encoding process shown in FIG. 2 can include two iterations or "passes" of processing the video data. The first pass can be carried out by encoder 20 using an encoding process that is less computationally intensive, and that gathers and stores information about input video stream 10 for use in the second pass. In the second pass, encoder 20 uses this information to optimize final encoding of compressed bitstream 24. For example, encoder 20 may use this information to select parameters for encoding, locating key-frames and selecting coding modes used to encode macroblocks 18, and allocating the number of bits to each frame. The output of the second pass can be final compressed bitstream 24.

Figure 3:
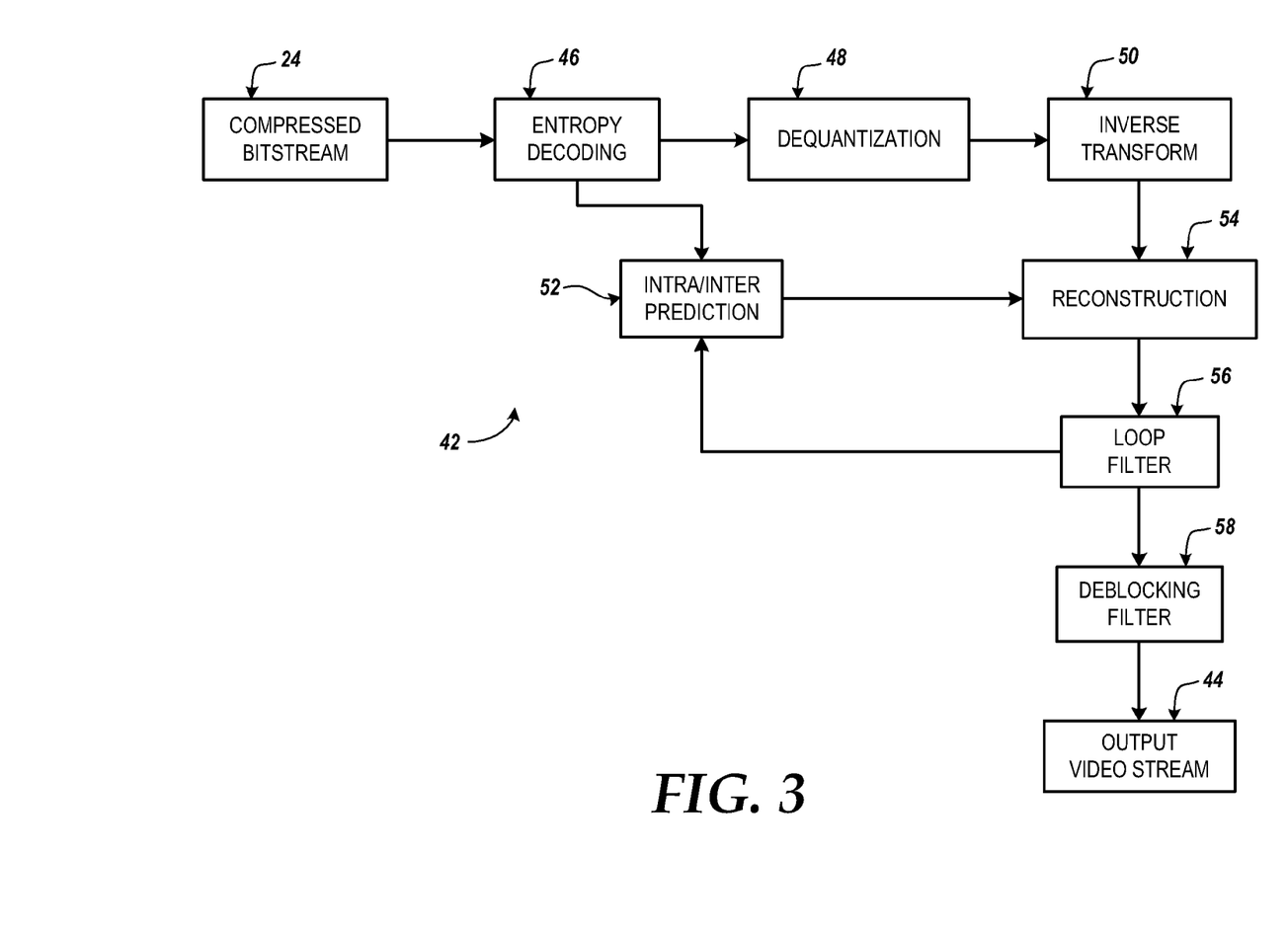
FIG. 3 is a block diagram of a video decompression system in accordance with another embodiment.

FIG. 3 is a block diagram of a video decompression system or decoder 42 to decode compressed bitstream 24. Decoder 42, similar to the reconstruction path of the encoder 20 discussed previously, includes the following stages to perform various functions to produce an output video stream 44 from compressed bitstream 24: an entropy decoding stage 46, a dequantization stage 48, an inverse transform stage 50, an intra/inter prediction stage 52, a reconstruction stage 54, a loop filter stage 56 and a deblocking filtering stage 58. Other structural variations of decoder 42 can be used to decode compressed bitstream 24.

When compressed bitstream 24 is presented for decoding, the data elements within compressed bitstream 24 can be decoded by entropy decoding stage 46 (using, for example, Context Adaptive Binary Arithmetic Decoding) to produce a set of quantized transform coefficients. Dequantization stage 48 dequantizes the quantized transform coefficients, and inverse transform stage 50 inverse transforms the dequantized transform coefficients to produce a derivative residual that can be identical to that created by the reconstruction stage in the encoder 20. Using header information decoded from the compressed bitstream 24, decoder 42 can use intra/inter prediction stage 52 to create the same prediction macroblock as was created in encoder 20. At the reconstruction stage 54, the prediction macroblock can be added to the derivative residual to create a reconstructed macroblock. The loop filter 56 can be applied to the reconstructed macroblock to reduce blocking artifacts. Deblocking filter 58 can be applied to the reconstructed macroblock to reduce blocking distortion, and the result is output as output video stream 44.

Other variations of decoder 42 can be used to decode compressed bitstream 24. For example, a decoder may produce output video stream 44 without deblocking filtering stage 58.

Referring again to encoder 20, video encoding methods compress video signals by using lossless or lossy compression algorithms to compress each frame or blocks of each frame of a series of frames. As can be implied from the description above, intra-frame coding refers to encoding a frame using data from that frame, while inter-frame coding refers to predictive encoding schemes such as schemes that comprise encoding a frame based on other so-called "reference" frames. For example, video signals often exhibit temporal redundancy in which frames near each other in the temporal sequence of frames have at least portions that match or at least partially match each other. Encoders can take advantage of this temporal redundancy to reduce the size of encoded data by encoding a frame in terms of the difference between the current frame and one or more reference frames.

As described briefly above, many video coding algorithms first partition each picture into macroblocks. Then, each macroblock can be coded using some form of predictive coding method. Some video coding standards use different types of predicted macroblocks in their coding. In one scenario, a macroblock may be one of three types: 1) Intra (I) macroblock that uses no information from other pictures in its coding; 2) Unidirectionally Predicted (P) macroblock that uses information from one preceding picture; and 3) Bidirectionally Predicted (B) macroblock that uses information from at least one past picture and at least one future picture.

To facilitate higher quality compressed video, it is helpful to have a matching reference frame in order to have the smallest difference to encode, which generally results in a more compact encoding. Reference frames are based on past frames, future frames, or an intra-frame so that the encoder can find a matching block to use in the predictive process as shown in, for example, U.S. Application Publication No.

2005/0286629. Reference frames can also be based on synthesized or constructed frames that are not shown to the end user after decoding, as shown in, for example, in U.S. Application Publication No. 2010/0061461 A1. Such constructed reference frames are referred to herein as "alternate reference frames." The alternate reference frames are constructed from macroblocks, which are referred to herein as "alternate reference blocks."

Figure 4:
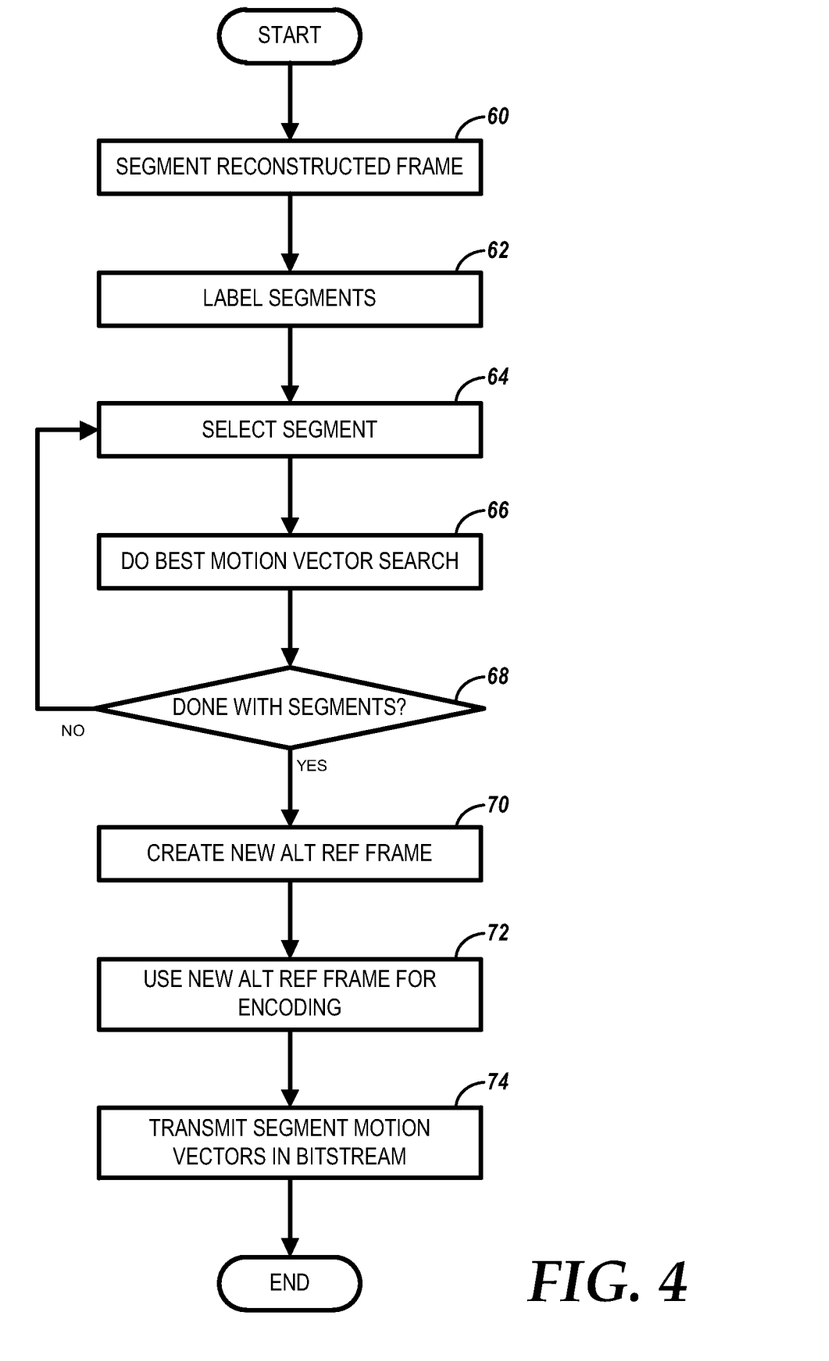
FIG. 4 is a flow chart of a method of encoding with a new alternate reference frame synthesized using segmentation and motion compensation as implemented in the encoder of FIG. 2.

Another method of creating and using an alternate reference frame is described herein. FIG. 4 is a flow chart of a method of encoding with a new alternate reference frame synthesized using segmentation and motion compensation as implemented in the encoder of FIG. 2. First, a reconstructed frame is selected and segmented (60). The reconstructed frame is obtained from the reconstruction path, and typically would be output from the loop filter 38. For example, the reconstructed frame may be a golden frame, an original alternate reference frame, or a last frame to be encoded. The reconstructed frame may be segmented into two or more segments of at least one pixel using a variety of segmentation parameters. For example, the reconstructed frame could be segmented using color segmentation or motion segmentation.

Color segmentation divides a frame into segments based upon the colors presented in the captured image. More specifically, when a camera captures images, the original color, typically RGB, for each pixel is converted and stored as a signal including separate luminance (or luma) and chrominance (or chroma) values. That is, each pixel is represented by a luma value Y and by two values collectively forming the chroma value, a chroma value U and a chroma value V. Luma values Y of the image represent the achromatic portion of an image (that is, the image without color), while the chroma values U and V are sometimes called color difference components and generally represent the color of the image. Most commonly, each luma value Y is a weighted sum of gamma-compressed red, green and blue components (R'G'B') represented by Y', and chroma values U and V are respectively equal to B'-Y' and R'-Y' represented by Cb and Cr. Here, the actual color format is not critical or limited and can be any color format or colorspace.

Encoder 20 and decoder 42 code macroblocks 18 of frame 16 using image formats that rely on chroma, chrominance or chromatic sampling or subsampling. That is, because human vision is more sensitive to black and white differences than to chromatic differences, a lower sampling rate (fewer bits) can be used to represent the chroma values of pixels of each frame 16 than to represent the luma values of those pixels. By example, encoder 20 and decoder 42 can code macroblocks 18 using 4:2:0 YUV chroma subsampling. This scheme halves the amount of data as compared to an image with no chroma subsampling as only one chroma value for each of chroma values U and V is sampled for every four luma values Y. This essentially means that while there are two chroma values for each group of four image pixels, there are four luma values.

As described above, when input video stream 10 is presented for encoding, each frame 16 within input video stream 10 is processed into units of macroblocks. At intra/inter prediction stage 26 of encoder 20, each macroblock can be encoded using either an intra prediction or inter prediction mode. The predictions for luma values Y and for chroma values U and V of the macroblock can be calculated independently of each other. Further, and in regard to the predictions for chroma values U and V, a prediction mode can treat these values identically (i.e., use the same relative addressing and arithmetic). In certain embodiments, predictions for chroma values U and V may be different. In the examples herein, pixels are considered with regard to their combined color value YUV.

Returning now to FIG. 4, a frame can be segmented (60) by segmenting individual macroblocks or by segmenting the frame in its entirety. As one example, segmenting can be performed by quad-tree decomposition (or deconstruction). One implementation of quad-tree decomposition initially subdivides the image into four equal-size blocks and then selectively subdivides the smaller blocks in a like manner if the smaller blocks have more than one different color value YUV for pixels in that block. That is, each block is subdivided into groups of four until each set of blocks represents pixels having a same color value YUV.

Note that while each set of blocks is said to represent pixels having the same color value YUV, in actuality the pixels in a set have values Y, U and V that are not necessarily the same. Instead, the blocks are sub-divided by defining an acceptable variance for each of the values Y, U and V for the pixels that form each set of blocks. In this manner, each set of blocks can be represented by three representative values for luma and chroma values. The representative values can be average values using the luma and chroma values of the individual pixels comprising a set. Alternatively, the representative values could be some other combination of the respective luma and chroma values of the pixels comprising that set. As one example, each of the representative values for luma and chroma could be average values of only certain of the pixel values, such as those that fall within a defined range about a median value.

In the example above, partitioning continues until the number of values YUV in a set is equal to one (that is, all the pixel values Y, U, V are within a maximum variance). The frame and/or each macroblock could instead be partitioned into sets of pixels based on another desirable threshold. For example, partitioning could occur until a fixed number of sets is defined.

Segmenting a frame (60) is not limited to quad-tree decomposition and can be implemented by binary-tree or octree decomposition in a similar manner. Also, these methods of segmenting a frame can be combined such that part of the segmentation is performed by one decomposition method while another part of the segmentation is performed by another decomposition method.

Another method of segmenting a frame (60) involves k-means clustering techniques, or similar, to produce either the smallest set of entries that ensures the reconstruction error is below a defined threshold, or a fixed number of entries. As known to those skilled in the art, k-means clustering is a method that can be used to partition n values into k clusters where each value belongs in the cluster with the nearest mean. In this case, for example, the number k can be predetermined for either a macroblock 18 or frame 16 such that a fixed number of clusters results.

An alternative implementation could first use a k-means segmentation to split the entire frame (irrespective of block boundaries) into N regions and then use binary-tree or quad-tree decomposition to encode region membership. Decomposition is stopped when all pixels in a sub-region have the same region membership, which is then encoded as a leaf node.

While the descriptions above implement segmentation using color, in another embodiment the frame could be segmented (60) by motion segmentation. Motion segmentation allows for division of a frame by identifying as segments various components that are independently moving in an image. For example, the image deconstruction or k-means segmentation described above could be implemented using the magnitude and direction of a motion vector as the variables for each pixel to be considered. Motion segmentation would require at least two adjacent reconstructed frames to establish the movement needed for segmentation. Other types of segmentation are also possible and may be used, such as expectation-maximization clustering techniques.

Segmentation may result in any number of different segments, each segment having any number of pixels. The methods disclosed herein may be used with any shape or size segment. The number of segments is based on accuracy versus the amount of data to be encoded (i.e., the bit cost). More segments require more bits for encoding, but the fewer the number of segments, generally the less accurate the reconstruction of the segmented images. Known techniques for comparing the bit cost of various encoding options can be incorporated with the techniques described herein to determine a desired number of segments.

Referring back to FIG. 4, once the segments have been determined (60), they are labeled with a segment identifier for processing (62). The segment identifier can be, for instance, a sequentially generated number created in the order of segment creation. Once the segments are labeled (62), a segment is selected for motion estimation processing (64). In this example where the motion parameter is a motion vector, a motion vector search is performed on the selected segment (66). A motion vector can be found by any motion estimation method such as full search or diamond search. One useful method is described in, for example, Hamosfakidis et al., "A Novel Hexagonal Search Algorithm for Fast Block Matching Motion Estimation," EURASIP Journal on Applied Signal Processing 2002:6, 595-600. Other methods are available and will be apparent to those skilled in the art.

Although this example describes motion estimation processing as searching for a motion vector (66), and the following steps describe using the motion vector as a motion parameter for the creation of the new alternate reference frame, the process described herein is not limited to using motion vectors to describe the movement of each segment. That is, segments may undergo movement other than no movement (zero motion vector) or simple translation (a motion vector having a non-zero magnitude and direction). Use of other motion parameters such as those associated with a zoom, a rotation or a shear is possible. Obtaining these motion parameters can be handled using an object based affine transform such as known to those skilled in the art. Examples of motion of a segment are described with respect to FIG. 7 hereinafter.

Once the motion vector for the selected segment is determined (66), the encoder 20 determines if the currently selected segment is the last available segment (68). If not, the next available segment is selected (64) and its motion vector is determined (66). Once a motion vector has been determined for each segment (68), a new alternate reference frame is created (70) using the segments and motion vectors. An exemplary process for creating the alternate reference frame is described in more detail later with respect to FIG. 6.

Once the alternate reference frame is created, it is then available in the intra/inter prediction stage 26 for encoding frames (72). The identification of segments and their motion vectors are transmitted in compressed bitstream 24 (74) for use by the decoder 42 to recreate the alternate reference frame for decoding those blocks/frames encoded by encoder 20 with reference to the alternate reference frame. In one embodiment, it is desirable to transmit the segment and its motion parameter, such as the motion vector, only if that segment has greater than a minimum number of pixels, such as 20. Such segments may also optionally be omitted when creating the alternate reference frame.

As mentioned, each motion parameter (e.g., a motion vector) transmitted is associated with a segment. For example, the association can be made by transmitting the segment identifier along with each motion vector. Additionally, an identifier of the segmentation parameters and method used to segment the frame may be transmitted to the decoder 42 so that the decoder 42 can recreate the same segments. Alternately, the segmentation parameters and method may be pre-negotiated between the encoder 20 and decoder 42 so that they need not be transmitted each time in step 74.

Figure 5:
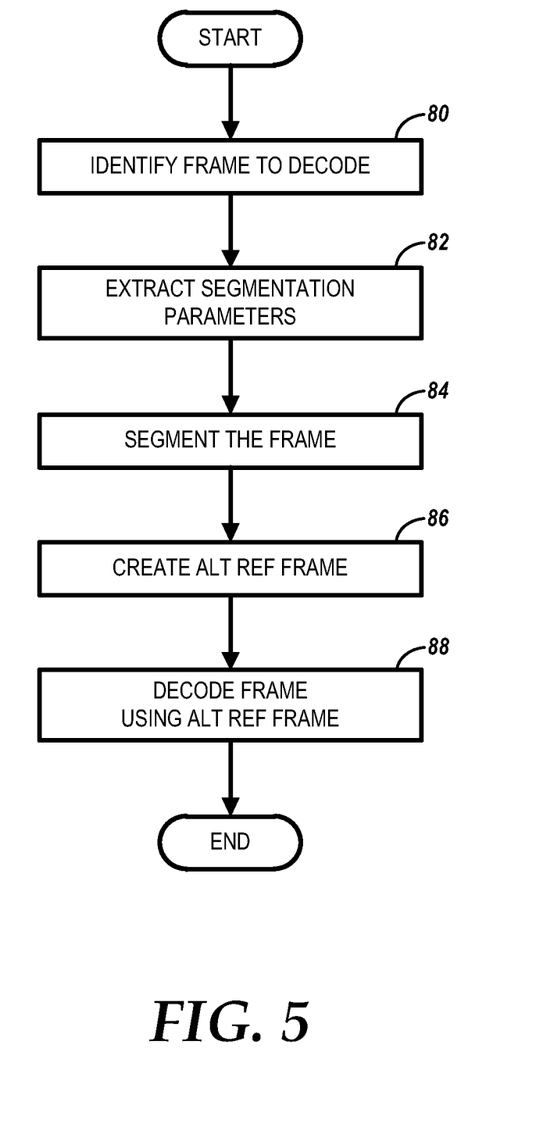
FIG. 5 is a flow chart of a method of decoding with a new alternate reference frame synthesized using segmentation and motion compensation as implemented in the decoder of FIG. 3.

FIG. 5 is a flow chart of a method of decoding with a new alternate reference frame synthesized using segmentation and motion compensation as implemented in the decoder of FIG. 3. First, a frame to be decoded is identified (80). In this example, the frame to be decoded was encoded by the encoder 20 using the alternate reference frame described with reference to FIG. 4. Once the frame is identified, the segmentation parameters used to segment the frame by the encoder 20 are determined (82). As described above, the segmentation parameters may be transmitted in the compressed bitstream 24 along with the frame to be decoded or may be pre-negotiated between the encoder 20 and decoder 42.

Once the segmentation parameters and method are determined, decoder 42 will then segment the frame to be decoded (84). The alternate reference frame will be created using motion vectors and segment labels encoded into the compressed bitstream 24 (86). An exemplary process for creating the alternate reference frame is described in more detail later with respect to FIG. 6. Once the alternate reference frame has been created, the frame to be decoded will be decoded using the new alternate reference frame (88).

Figure 6:
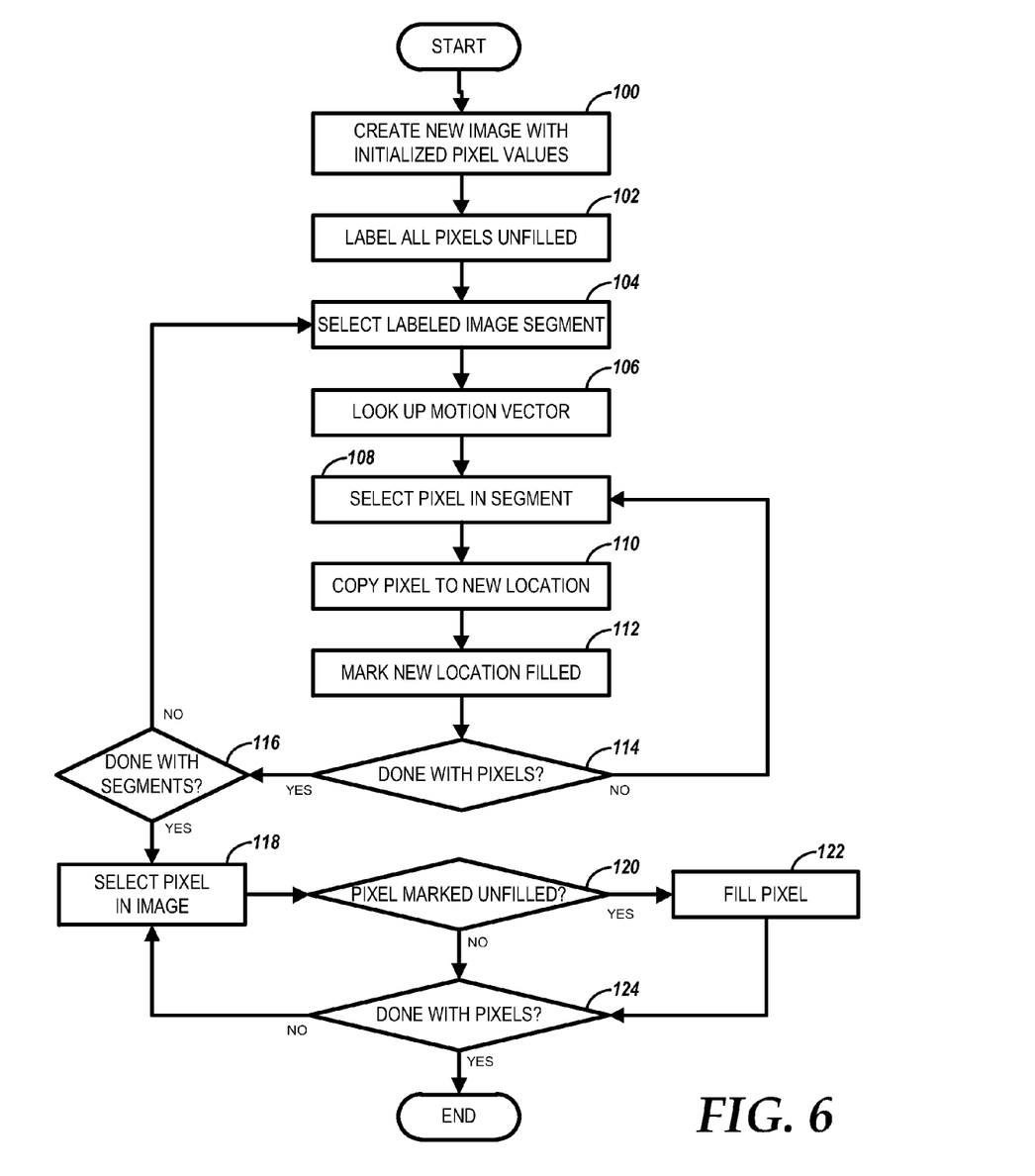
FIG. 6 is a flow chart of a method of creating a new alternate reference frame using segments and motion vectors as shown in FIGS. 4 and 5.

Now, with respect to FIG. 6, a method of creating a new alternate reference frame using segments and motion vectors is described. The method uses segments and motion vectors as provided by either the encoder 20 or decoder 42 as described with respect to FIGS. 4 and 5 above. First, a frame is initialized with initial pixel values (100). The initial pixel values may be any desirable default value, such as zero. Each pixel is initially marked as unfilled (102).

A first segment is selected (104) thereafter, and the motion vector related to the segment is looked up (106). The motion vector may be associated with the segment by way of a segment identifier as described previously.

A pixel in the segment is then selected (108). The new location of the pixel is calculated using the previously selected motion vector. Alternatively, the pixel may have more than one new location, depending on the type of motion parameter associated with the segment. Once the at least one new location is determined, the pixel is copied to that at least one new location (110). In some implementations, calculating the new location of the pixel may include comparing the new location to a range of locations of the alternate reference frame to determine whether the new position is within the range of positions of the alternate reference frame, and copying a value associated with the pixel in the new position in the alternate reference frame if the new position is within the range of positions of the alternate reference frame.

Typically, the pixel will be copied to the new location even if that pixel location already has been filled with a pixel from another segment. But alternatively, the new pixel may be averaged or by some other means combined with the pixel that was previously copied. The new location is then marked as a filled location (112). If there are additional pixels in the current segment to be processed (114), the next pixel is selected (108), the new pixel is copied to its new location (110), and the new located in marked as filled (112). This process repeats until all pixels in the current segment are moved by the segment's motion vector (114).

If additional segments need to be processed (116), a new segment is selected (104) so as to move its pixels in accordance with the motion vector for that new segment. Otherwise, a first pixel from the alternate reference frame is selected (118). A query is then made as to determine whether the pixel has been filled (120). If the pixel is not marked as filled, the pixel is filled (122). The pixel may be filled by, for example, determining the value of a nearby filled pixel and copying that pixel value to the currently selected unfilled pixel. Alternatively, the pixel may be filled by calculating an average value of nearby filled pixels. The pixel may be filled by copying a pixel from a reconstructed frame. Other methods of filling unfilled pixels are available and may be used.

Once the unfilled pixel has been filled (122) or if the current pixel was already filled (120), the method determines whether there are additional pixels to process (124). If so, control returns to select the next available pixel (118). Otherwise, the method ends as the new alternate reference frame is completed.

Figure 7:
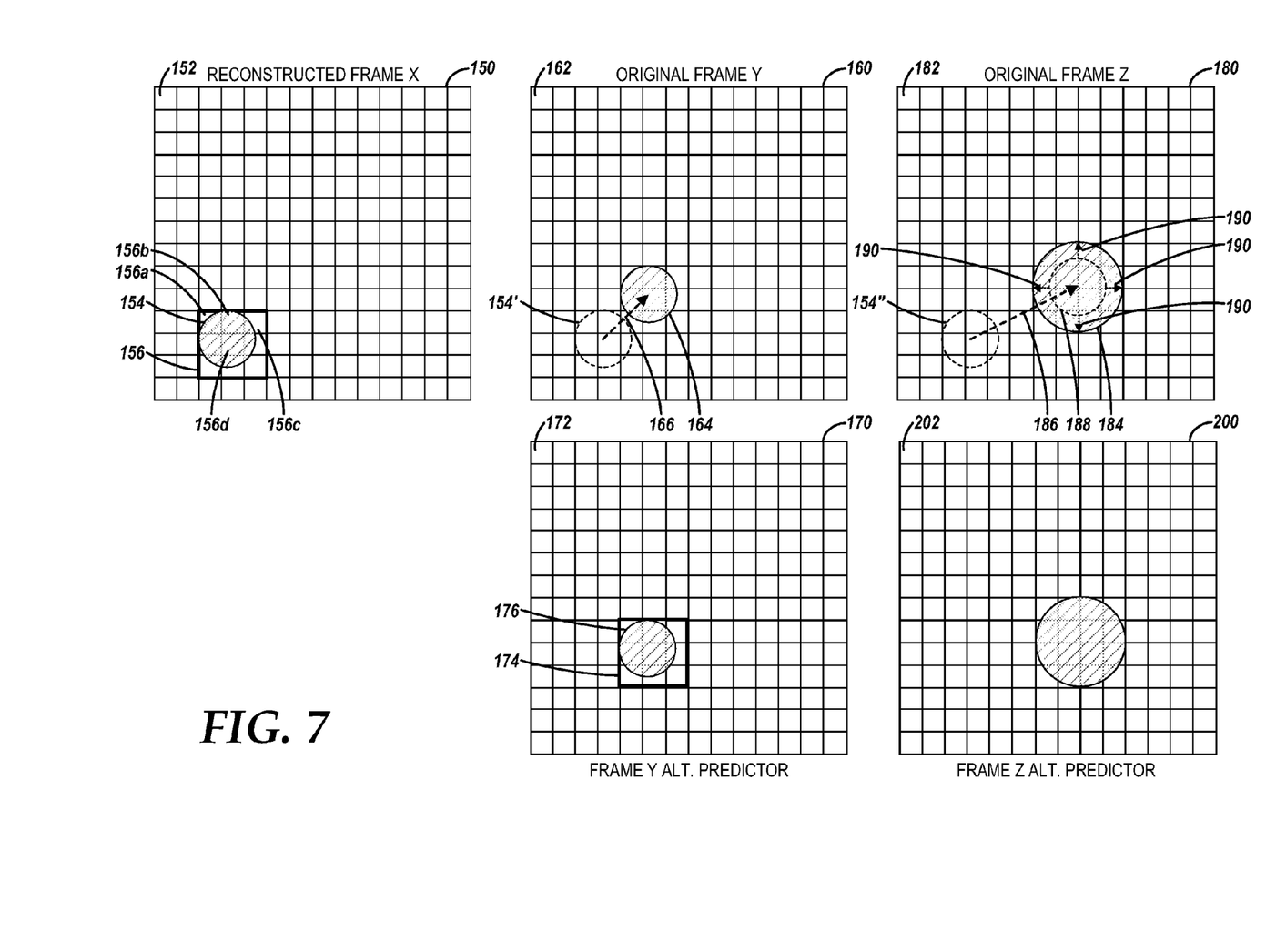
FIG. 7 is a schematic diagram illustrating exemplary frames of a video bitstream as used and created by the methods of FIGS. 4-6.

FIG. 7 is a schematic diagram illustrating exemplary frames of a video bitstream as used and created by the methods of FIGS. 4-6. FIG. 7 shows an exemplary application of color segmentation. The figure includes a reconstructed frame X 150. The reconstructed frame X 150 can include macroblocks, such as macroblock 152. Reconstructed frame X contains a circular object 154. In this example, circular object 154 contains color values distinct from the remainder of the reconstructed frame X 150.

Circular object 154 occupies space within a macroblock cluster 156. Each macroblock in macroblock cluster 156 may include one or more pixels comprising circular object 154. For example, macroblocks 156a-d contain a varying percentage of pixels that are a part of circular object 154. For example, while macroblock 156d is entirely inclusive of circular object 154 pixels, only a small portion of macroblock 156c includes circular object 154 pixels.

The application of reconstructed frame X 150 to the new alternate reference frame encoding method described in FIG. 4 will now be described. As applied to the method, reconstructed frame X 150 is analogous to the reconstructed frame of step 60. The circular object 154 portrays an exemplary segment that could, for example, be created in the segmentation process of steps 60 and 62. The exemplary segment, in this case, is defined by the color of circular object 154.

The segment is defined at a granularity of size less than a macroblock. For example, the entire macroblock 156c is not included in the segment defined by circular object 154, since circular object 154 only has a small number of pixels within macroblock 156c.

The segment of circular object 154 can be used to predict other frames, such as original frame Y 160. Original frame Y 160 also includes macroblocks such as macroblock 162. Original frame Y 160 includes a second circular object 164. In this example, circular object 164 is the same size, shape, and color as circular object 154, but is in a different location within the frame. The relative location is illustrated by the dotted circle indicating the position of circular object 154 with respect to original frame Y 160 (154').

To utilize reconstructed frame X 150 as a basis for a new alternate reference frame 170 for original frame Y 160, a motion vector 166 must be determined for the exemplary segment. The motion vector 166 is determined as discussed in the motion vector search step 66. The new alternate reference frame 170 is created using the reconstructed frame X 150, the exemplary segment corresponding to the circular object 154 and the motion vector 166. The process of creating the new reference frame is as defined in step 70 and in the method of FIG. 6.

The exemplary segment is moved pixel by pixel into the new alternate reference frame 170, creating a second circular segment predictor 176. The new alternate reference frame 170 is composed of macroblocks such as macroblock 172. Even though the second circular object predictor 176 is within a macroblock cluster 174, only the pixels needed to create the second circular object predictor 176 are moved. Every pixel within macroblock cluster 174 is not necessarily moved to create the new reference frame.

The segment of circular object 154 can also be used to predict another frame, such as original frame Z 180. Original frame Z 180 also includes macroblocks such as macroblock 182. Original frame Z 180 includes a third circular object 184 that is the same shape and color as circular object 156, but is in a different location within the frame and is a larger size. Essentially, this reflects the existence of movement of third circular object 184 indicating both a zoom and a simple translation. The relative location is illustrated by the dotted circle indicating the position of circular object 154 with respect to original frame Z 180 (154").

The third circular object 184 illustrates the application of more than one motion parameter to the segment of circular object 154 to create an alternate reference frame 200. Alternate reference frame 200 includes blocks such as macroblock 202. Motion vector 186 illustrates the transposition of the position of the circular object 156 to the position of circular object 184. The new position of circular object 154 after applying motion vector 186 is shown by the dotted circle location 188. The arrows 190 depict a zoom-type operation on circular object 154 at location 188 that would be represented by other motion parameters. These multiple motion parameters would be determined, for example, in the motion vector search (66) of FIG. 4.

The exemplary frames shown in FIG. 7 are included purely for illustrative purposes to demonstrate one application of the methods described above. Numerous other applications, including those with much more complex frames and segments are possible. In addition, variations of the methods disclosed above may be used. These variations may have more or less steps or may perform steps in different orders. For example, the segment labeling (62) of FIG. 4 may not be performed, or elements of segment labeling (62) may be performed within another step, such as segmenting the reconstruction frame (60). Another exemplary modification may be to perform the motion vector search (66) for each segment in parallel instead of sequentially (64, 66 and 68) as shown in FIG. 4.

The operation of encoding can be performed in many different ways and can produce a variety of encoded data formats. The above-described embodiments of encoding or decoding may illustrate some exemplary encoding techniques. However, in general, encoding and decoding are understood to include any transformation or any other change of data whatsoever.

Encoder 20 and/or decoder 42 (and the algorithms, methods, instructions etc. stored thereon and/or executed thereby) can be implemented in whole or in part by one or more processors which can include computers, servers, or any other computing device or system capable of manipulating or processing information now-existing or hereafter developed including optical processors, quantum processors and/or molecular processors. Suitable processors also include, for example, general purpose processors, special purpose processors, IP cores, ASICS, programmable logic arrays, programmable logic controllers, microcode, firmware, microcontrollers, microprocessors, digital signal processors, memory, or any combination of the foregoing. In the claims, the term "processor" should be understood as including any the foregoing, either singly or in combination. The terms "signal" and "data" are used interchangeably.

Encoder 20 and/or decoder 42 also include a memory, which can be connected to the processor through, for example, a memory bus. The memory may be read only memory or random access memory (RAM) although any other type of storage device can be used. Generally, the processor receives program instructions and data from the memory, which can be used by the processor for performing the instructions. The memory can be in the same unit as the processor or located in a separate unit that is coupled to the processor.

Figure 8:
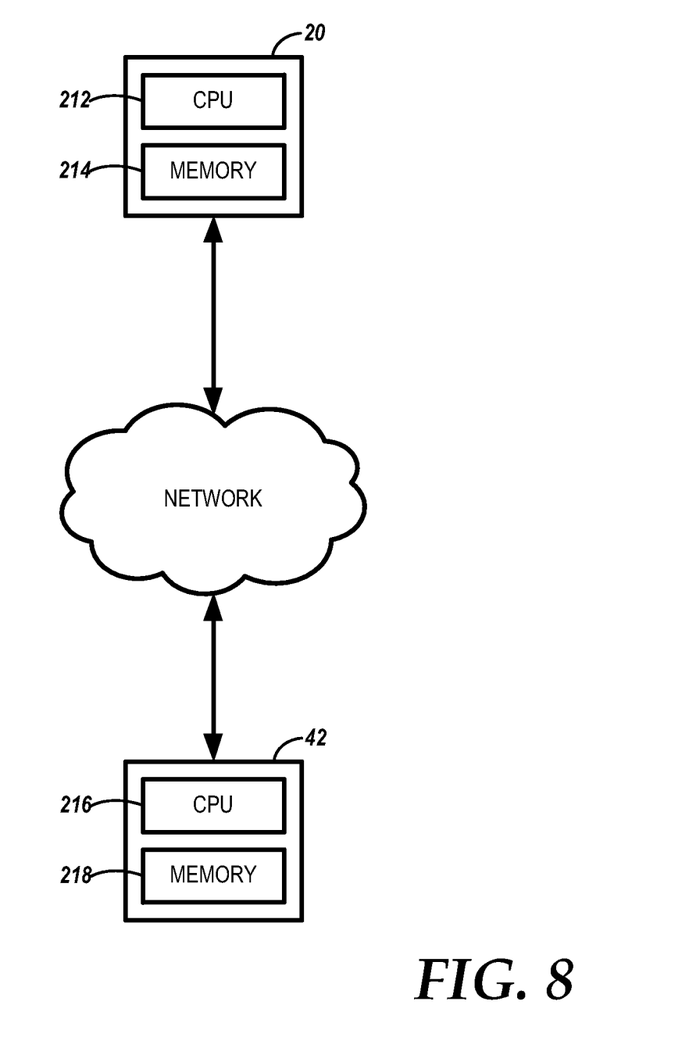
FIG. 8 is a block diagram of computer systems implementing the video compression system and video decompression system described herein.

For example, encoder 20 can be implemented using a general purpose processor with a computer program that, when executed, carries out any of the respective methods, algorithms and/or instructions described herein. FIG. 8 illustrates one suitable implementation in which encoder 20 is implemented in a general purpose computer including a central processing unit (CPU) 212 and random access memory (RAM) 214. Decoder 42 is implemented using a general purpose computer including a central processing unit (CPU) 216 and random access memory (RAM) 218. In addition or alternatively, for example, a special purpose processor can be utilized which can contain specialized hardware for carrying out any of the methods, algorithms and/or instructions described herein. Portions of encoder 20 or decoder 42 do not necessarily have to be implemented in the same manner. Thus, for example, intra/inter prediction stage 26 can be implemented in software whereas transform stage 28 can be implemented in hardware. Portions of encoder 20 or portions of decoder 42 may also be distributed across multiple processors on the same machine or different machines or across a network such as a local area network, wide area network or the Internet.

Encoder 20 and decoder 42 can, for example, be implemented in a wide variety of configurations, including for example on servers in a video conference system. Alternatively, encoder 20 can be implemented on a server and decoder 42 can be implemented on a device separate from the server, such as a hand-held communications device such as a cell phone. In this instance, encoder 20 can compress content and transmit the compressed content to the communications device, using the Internet for example, as shown in FIG. 8. In turn, the communications device can decode the content for playback. Alternatively, the communications device can decode content stored locally on the device (i.e. no transmission is necessary). Other suitable encoders and/or decoders are available. For example, decoder 42 can be on a personal computer rather than a portable communications device.

The operations of encoder 20 or decoder 42 (and the algorithms, methods, instructions etc. stored thereon and/or executed thereby) can be realized in hardware, software or any combination thereof. All or a portion of embodiments of the present invention can take the form of a computer program product accessible from, for example, a computer-usable or computer-readable medium. A computer-usable or computer-readable medium can be any device that can, for example tangibly contain, store, communicate, and/or transport the program for use by or in connection with any processor. The medium can be, for example, an electronic, magnetic, optical, electromagnetic, or a semiconductor device. Other suitable mediums are also available.

The above-described embodiments have been described in order to allow easy understanding of the present invention and do not limit the present invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A method for encoding a current frame of a video signal having a plurality of frames, each frame having a plurality of pixels, the method comprising:
    segmenting a previously reconstructed frame into a plurality of image segments using a segmentation parameter, at least one image segment from the plurality of image segments having a segment identifier;
    determining, using a processor, a motion parameter for each respective image segment from the plurality of image segments;
    creating an alternate reference frame from the previously reconstructed frame using the motion parameter for each respective image segment from the plurality of image segments; and
    encoding the current frame using the alternate reference frame for motion prediction.

2. The method of claim 1 wherein the previously reconstructed frame is one of a golden frame, an original alternate reference frame, or a last frame to be encoded.

3. The method of claim 1, further comprising:
    identifying an association between the current frame and the previously reconstructed frame;
    identifying an association between the current frame and the motion parameter for each respective image segment from the plurality of image segments; and
    identifying an association between the current frame and the segmentation parameter.

4. The method of claim 3, further comprising: including at least one of the identified associations in the encoded output.

5. The method of claim 1 wherein segmenting the previously reconstructed frame comprises using at least one of color segmentation or motion segmentation, and the segmentation parameter comprises at least one of a color or a motion vector for each pixel of the previously reconstructed frame.

6. The method of claim 1 wherein segmenting the previously reconstructed frame comprises performing at least one of k-means clustering, binary tree deconstruction, quad-tree deconstruction, or oct-tree deconstruction.

7. The method of claim 1 wherein determining the motion parameter for each respective image segment from the plurality of image segments comprises:
    performing a motion vector search on pixels making up each respective image segment from the plurality of image segments; and
    selecting a motion vector based on the motion vector search for each respective image segment from the plurality of image segments as the motion parameter.

8. The method of claim 1 wherein creating the alternate reference frame comprises:
    calculating a new position for each pixel of each respective image segment from the plurality of image segments using the motion parameter of each respective image segment from the plurality of image segments;
    comparing the new position to a range of positions of the alternate reference frame; and on a condition that the new position is within the range of positions of the alternate reference frame, copying a value associated with the pixel in the new position in the alternate reference frame.

9. The method of claim 1 wherein creating the alternate reference frame comprises:
for each image segment in the plurality of image segments:
calculating a new position for each pixel of the image segment using the motion parameter of the image segment;
comparing the new position to a range of positions of the alternate reference frame; and
on a condition that the new position is within the range of positions of the alternate reference frame, copying a value associated with the pixel in the new position in the alternate reference frame.

10. The method of claim 9 wherein creating the alternate reference frame comprises:
selecting an unfilled pixel of the alternate reference frame that has no value copied to it after values for all pixels of the previously reconstructed frame having the new position within the range of positions of the alternate reference frame are copied into the new position in the alternate reference frame;
determining a desired value for the unfilled pixel; and
copying the desired value to the unfilled pixel.

11. The method of claim 10 wherein determining the desired value comprises selecting one of a value of a nearby filled pixel, an average of more than one nearby filled pixel, or a value of the pixel at the same location in the current frame to be encoded.

12. The method according to claim 9, further comprising:
initializing values for each pixel in the alternate reference frame to zero and labeling each pixel in the new frame as unfilled before comparing the new position to the range of positions of the alternate reference frame; and
on a condition that the new position is within the range of positions of the alternate reference frame, changing a label for the pixel to filled.

13. The method of claim 1 wherein the motion parameter for each respective image segment from the plurality of image segments is at least one of a motion vector or a parameter reflecting at least one of a zoom, a rotation, or a shear of the image segment.

14. The method of claim 1 wherein creating the alternate reference frame from the previously reconstructed frame includes omitting an image segment and a respective motion parameter, wherein the image segment includes fewer than a predetermined number of pixels.

15. The method of claim 1, wherein encoding the current frame includes using the alternate reference frame for motion prediction in response to determining whether to use the alternate reference frame or the previously reconstructed frame for motion prediction.

16. The method of claim 1, wherein the alternate reference frame is not a reconstructed frame.

\* \* \* \* \*